(12) United States Patent
Yamamoto et al.

(10) Patent No.: US 12,080,142 B2
(45) Date of Patent: Sep. 3, 2024

(54) INFORMATION PRESENTATION METHOD, INFORMATION PRESENTATION SYSTEM, AND INFORMATION PRESENTATION APPARATUS

(71) Applicant: Panasonic Intellectual Property Management Co., Ltd., Osaka (JP)

(72) Inventors: Masaya Yamamoto, Kyoto (JP); Tomoki Ogawa, Osaka (JP); Kunio Gobara, Osaka (JP); Atsushi Tanaka, Osaka (JP); Masashi Hitotsuya, Osaka (JP); Makoto Yoshino, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/258,730

(22) PCT Filed: Feb. 25, 2020

(86) PCT No.: PCT/JP2020/007387
§ 371 (c)(1),
(2) Date: Jan. 7, 2021

(87) PCT Pub. No.: WO2020/189186
PCT Pub. Date: Sep. 24, 2020

(65) Prior Publication Data
US 2021/0287516 A1 Sep. 16, 2021

(30) Foreign Application Priority Data
Mar. 19, 2019 (JP) .................. 2019-051682

(51) Int. Cl.
*G08B 21/18* (2006.01)
*G06Q 30/0251* (2023.01)

(52) U.S. Cl.
CPC ......... *G08B 21/18* (2013.01); *G06Q 30/0255* (2013.01)

(58) Field of Classification Search
CPC . G06Q 30/0207–0277; G06Q 30/0255; G06Q 10/06; G06Q 50/06; G08B 21/18
(Continued)

(56) References Cited

U.S. PATENT DOCUMENTS

2004/0254810 A1\* 12/2004 Yamaga ............. G06Q 30/0255
705/7.29
2007/0234213 A1\* 10/2007 Krikorian .......... H04N 21/2362
375/E7.024

(Continued)

FOREIGN PATENT DOCUMENTS

| JP | 2014-215889 | 11/2014 |
| JP | 2017-167953 | 9/2017 |

(Continued)

OTHER PUBLICATIONS

Gabriella M. Harari, Using Smartphones to Collect Behavioral Data in Psychological Science: Opportunities, Practical Considerations, and Challenges, 2016 (Year: 2016).\*

(Continued)

*Primary Examiner* — Tarek Elchanti
(74) *Attorney, Agent, or Firm* — Rimon P.C.

(57) ABSTRACT

An information presentation method includes: sequentially obtaining, from a first appliance, appliance data including an operation status of the first appliance; receiving, from a second appliance different from the first appliance, notification of an opportunity of presenting information by the second appliance; determining, after receiving the notification in the receiving, whether to present the information by the second appliance, based on the appliance data obtained in the sequentially obtaining; and instructing the second (Continued)

appliance to present the information when determining to present the information by the second appliance in the determining, and prohibiting the second appliance from presenting the information when determining not to present the information by the second appliance in the determining.

11 Claims, 8 Drawing Sheets

(58) Field of Classification Search
USPC .................. 705/14.53, 7.29; 342/357.34
See application file for complete search history.

(56) References Cited

U.S. PATENT DOCUMENTS

| | | | | |
|---|---|---|---|---|
| 2009/0006177 | A1* | 1/2009 | Beaver | G06Q 30/0263 |
| | | | | 705/14.6 |
| 2009/0248524 | A1* | 10/2009 | Defoy | G06Q 30/0272 |
| | | | | 705/14.1 |
| 2011/0270618 | A1* | 11/2011 | Banerjee | G06Q 40/02 |
| | | | | 342/357.34 |
| 2014/0074621 | A1* | 3/2014 | Chai | G06Q 30/0242 |
| | | | | 705/14.66 |
| 2015/0134408 | A1 | 5/2015 | Yamagata et al. | |
| 2015/0193810 | A1* | 7/2015 | Lidow | G06Q 30/0241 |
| | | | | 705/14.4 |
| 2015/0248706 | A1* | 9/2015 | Mi | H04L 67/535 |
| | | | | 705/14.53 |
| 2015/0341453 | A1* | 11/2015 | Miller | H04W 4/21 |
| | | | | 709/204 |
| 2016/0071129 | A1 | 3/2016 | Ohhara et al. | |
| 2017/0270433 | A1 | 9/2017 | Tsubouchi et al. | |
| 2019/0073698 | A1* | 3/2019 | Pearson | G06Q 30/0251 |

FOREIGN PATENT DOCUMENTS

| | | | | |
|---|---|---|---|---|
| WO | 2013/164911 | A1 | 11/2013 | |
| WO | WO-2021010041 | A1 * | 1/2021 | G06F 16/335 |

OTHER PUBLICATIONS

International Search Report issued in corresponding International (PCT) Application No. PCT/JP2020/007387, dated Jun. 2, 2020, with English translation.

* cited by examiner

FIG. 6

| Timing information | Appliance data type | Use example |
|---|---|---|
| Washing time | Washing operation of washing machine | Presentation of detergent or fabric softener ad |
| Child's study time | Power state of air conditioner or light fixture in child's room | Presentation of correspondence course ad to parent |
| Child's bedtime | Power state of light fixture in child's room | Presentation of ad relating to parent's personal preference |
| Housework finish time | Power state of vacuum cleaner | Presentation of supermarket's special sale information |
| Night drink time | Opening and closing state of refrigerator | Introduction of new alcoholic beverage or snack product |
| Night ice-cream time | Opening and closing state of freezer | Introduction of new ice cream product |
| Television time with child | Power states of light fixture in child's room and television | Presentation of toy ad |
| Family gathering time | Detection result of human sensor of air conditioner, power state of light fixture in each room | Presentation of travel ad, event information, etc. |
| Mealtime | Daily rice cooking operation of rice cooker | Presentation of seasoning ad, etc. |
| Child's return home time | Daily power state of light fixture or television | Presentation of cram school ad |
| Holiday wakeup time | Power state of light fixture in bedroom | Presentation of suitable brunch ingredient ad |

FIG. 7

| Presentation information | User attribute information | Presentation timing |
|---|---|---|
| New detergent product that curves smell even in indoor drying | Female, full-time, urban area | Within 30 minutes after washing end |
| Correspondence course for new junior high students | 40s, with child, education | Child's study time |
| New 4K-compatible recorder product | Recorder, high income, male | Child's bedtime |
| Supermarket's special sale information | Part-time, reside near supermarket | Within 1 hour after cleaning end |
| Easy-to-cook mapo tofu sauce | Female, full-time | Within 2 hours before dinner cooking time |
| ... | ... | ... |

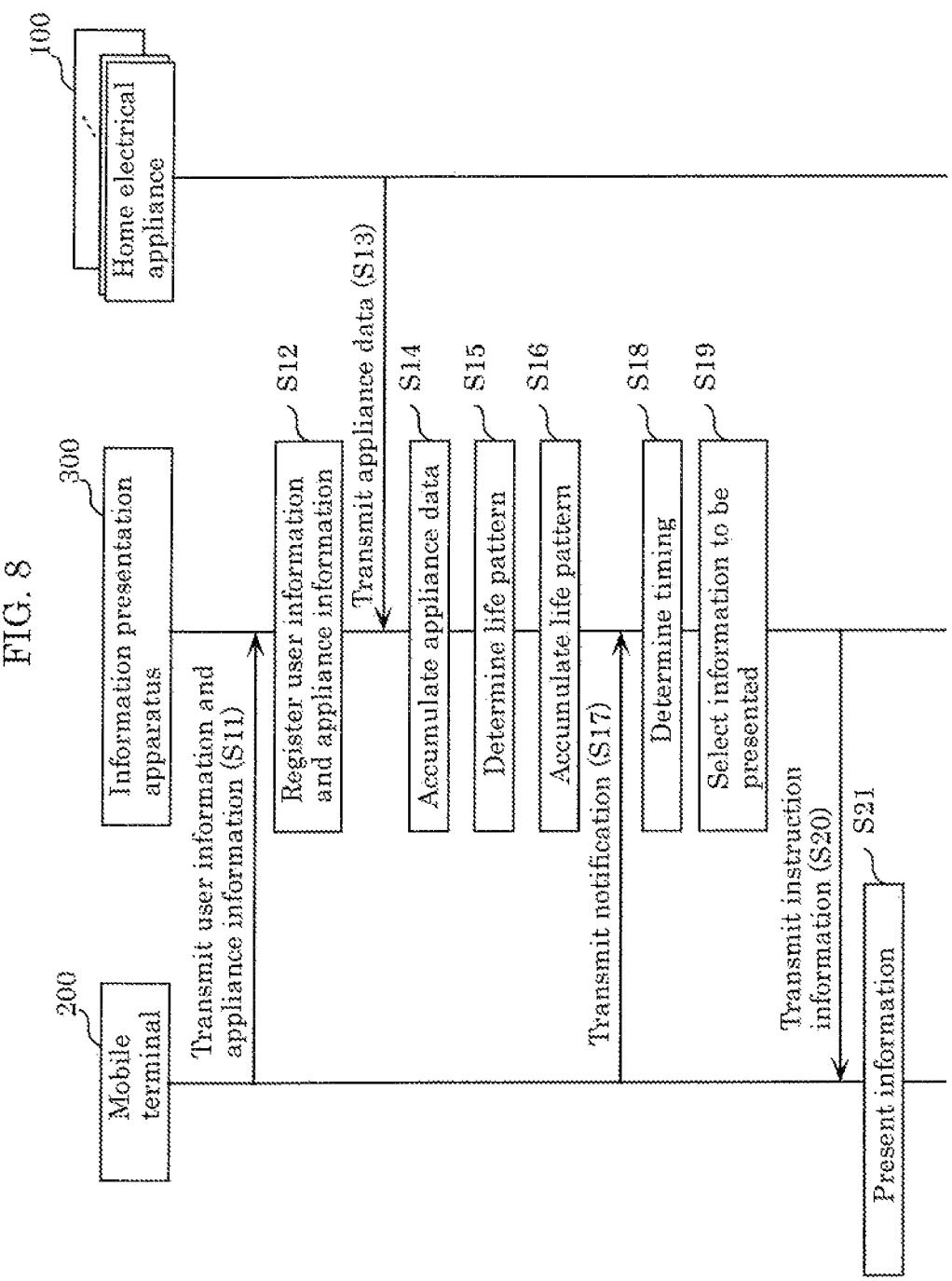

INFORMATION PRESENTATION METHOD, INFORMATION PRESENTATION SYSTEM, AND INFORMATION PRESENTATION APPARATUS

CROSS-REFERENCE OF RELATED APPLICATIONS

This application is the U.S. National Phase under 35 U.S.C. § 371 of International Patent Application No. PCT/JP2020/007387, filed on Feb. 25, 2020, which in turn claims the benefit of Japanese Application No. 2019-051682, filed on Mar. 19, 2019, the entire disclosures of which Applications are incorporated by reference herein.

TECHNICAL FIELD

The present disclosure relates to an information presentation method, an information presentation system, and an information presentation apparatus.

BACKGROUND ART

Patent Literature (PTL) 1 discloses an information distribution system that distributes appropriate information to each user based on the position of a terminal device and the time.

CITATION LIST

Patent Literature

PTL 1
International Patent Application Publication No. 2013/164911.

SUMMARY OF INVENTION

Technical Problem

The present disclosure provides an information presentation method, etc. capable of presenting information to a user at an optimal timing for the user.

Solution to Problem

An information presentation method according to the present disclosure includes: sequentially obtaining, from a first appliance, appliance data including an operation status of the first appliance; receiving, from a second appliance different from the first appliance, notification of an opportunity of presenting information by the second appliance; determining, after receiving the notification in the receiving, whether to present the information by the second appliance, based on the appliance data obtained in the sequentially obtaining; and instructing the second appliance to present the information when determining to present the information by the second appliance in the determining, and prohibiting the second appliance from presenting the information when determining not to present the information by the second appliance in the determining.

The general and specific aspects of the present disclosure may be implemented using a system, an apparatus, an integrated circuit, a computer program, or a computer-readable recording medium such as CD-ROM, or any combination of systems, apparatuses, integrated circuits, computer programs, and recording media.

Advantageous Effects of Invention

The information presentation method according to the present disclosure is capable of presenting appropriate information to a user at an optimal timing.

BRIEF DESCRIPTION OF DRAWINGS

FIG. 6 is a diagram illustrating an example of timing correspondence information for determining a life pattern using appliance data.
FIG. 7 is a diagram illustrating an example of presentation information associated with timing information.
FIG. 8 is a sequence diagram illustrating an example of an information presentation method by the information presentation system.

DESCRIPTION OF EMBODIMENTS

Figure 1:
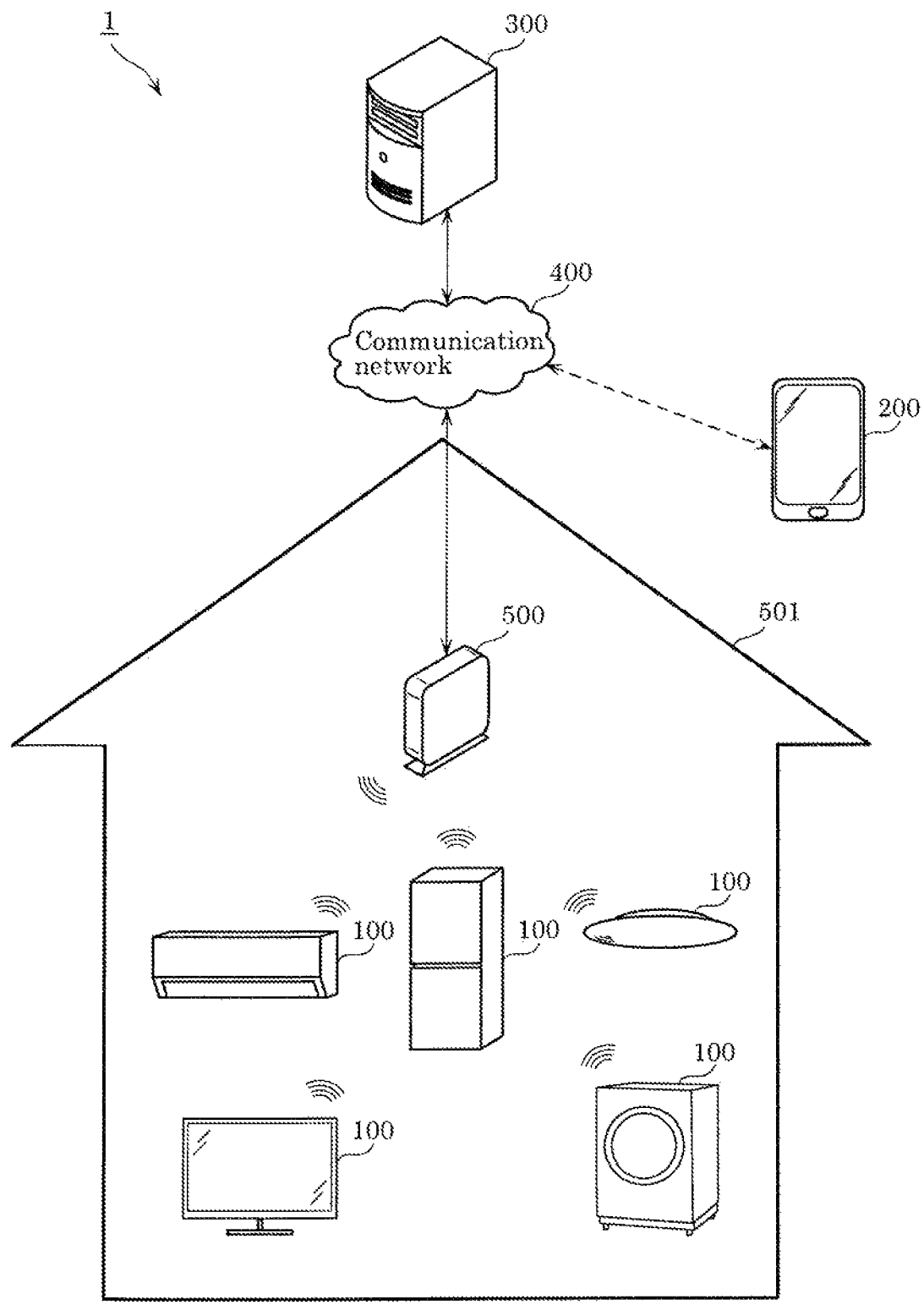
FIG. 1 is a schematic diagram of an information presentation system according to Embodiment 1.

An information presentation method according to the present disclosure includes: sequentially obtaining, from a first appliance, appliance data including an operation status of the first appliance; receiving, from a second appliance different from the first appliance, notification of an opportunity of presenting information by the second appliance; determining, after receiving the notification in the receiving, whether to present the information by the second appliance, based on the appliance data obtained in the sequentially obtaining; and instructing the second appliance to present the information when determining to present the information by the second appliance in the determining, and prohibiting the second appliance from presenting the information when determining not to present the information by the second appliance in the determining.

Thus, whether to present the information by the second appliance is determined according to the appliance data obtained from the first appliance, so that the information can be presented by the second appliance at a timing according to the appliance data. Moreover, the subsequent determination and instruction are not performed unless the notification is received from the second appliance, with it being possible to prevent frequent presentation of information by the second appliance. Hence, the user can be kept from being bothered with unnecessary information presentation, and the information can be presented to the user at an optimal timing for the user. In addition, the processing load and the power consumption of the second appliance can be reduced.

The information presentation method may further include: selecting one candidate from a plurality of candidates as the information to be presented by the second appliance, according to the appliance data obtained in the sequentially obtaining, wherein the instructing the second appliance to present the information includes instructing the second appliance to present, as the information, the one candidate selected in the selecting.

Thus, optimal information according to the appliance data can be presented to the user.

The information presentation method may further include: accumulating, in a storage device, a plurality of items of appliance data sequentially obtained in the sequentially obtaining, the plurality of items of appliance data each being the appliance data, wherein the selecting includes selecting the one candidate from the plurality of candidates as the information to be presented by the second appliance, according to the plurality of items of appliance data accumulated in the storage device.

Thus, optimal information according to the accumulated plurality of items of appliance data can be presented to the user.

Each of the plurality of items of appliance data sequentially obtained in the sequentially obtaining may include time information indicating a time at which the item of appliance data is generated in the first appliance.

Thus, optimal information according to the plurality of items of appliance data that are the accumulated plurality of items of appliance data and each include time information can be presented to the user.

The selecting may include estimating a next behavior of a user of the second appliance according to the plurality of items of appliance data accumulated in the storage device, and selecting, as the information to be presented by the second appliance, the one candidate from the plurality of candidates according to the next behavior estimated.

Thus, optimal information according to the behavior which the user is estimated to perform next can be presented to the user.

The information presentation method may further include: obtaining a preference of a user of the second appliance, wherein the selecting includes selecting the one candidate from the plurality of candidates according to the preference of the user obtained in the obtaining.

Thus, optimal information according to the preference of the user can be presented to the user.

The information presentation method may further include: obtaining position information indicating a position of the second appliance, from the second appliance, wherein the determining includes determining whether to present the information by the second appliance, based on the appliance data and the position information.

Thus, whether to present the information by the second appliance is determined further according to the position information indicating the position of the second appliance, so that the information can be presented by the second appliance at a timing according to the appliance data and the position information.

The appliance data may include at least one selected from: a power state indicating whether power of the first appliance is on or off; an opening and closing state of an opening and closing portion in the first appliance; and a detection result of a human sensor in the first appliance.

Thus, whether to present the information by the second appliance is determined according to the appliance data that includes at least one of the power state, the opening and closing state, and the human detection result obtained from the first appliance, so that the information can be presented by the second appliance at a timing according to at least one of the power state, the opening and closing state, and the human detection result.

The first appliance may be one of a television, a recorder, and a tuner, and the appliance data may be viewed program information indicating a program viewed on the first appliance.

Thus, whether to present the information by the second appliance is determined according to the appliance data including the viewed program information obtained from the first appliance, so that the information can be presented by the second appliance at a timing according to the viewed program information.

The sequentially obtaining may include sequentially obtaining, from each of a plurality of first appliances, appliance data including an operation status of the first appliance, the plurality of first appliances each being the first appliance, and the determining may include determining, after receiving the notification in the receiving, whether to present the information by the second appliance, based on a plurality of items of appliance data obtained from the plurality of first appliances in the sequentially obtaining, the plurality of items of appliance data each being the appliance data.

Thus, whether to present the information by the second appliance is determined according to the plurality of items of appliance data obtained from the plurality of first appliances, so that the information can be presented by the second appliance at a timing according to the plurality of items of appliance data.

The general and specific aspects of the present disclosure may be implemented using a system, an apparatus, an integrated circuit, a computer program, or a computer-readable recording medium such as CD-ROM, or any combination of systems, apparatuses, integrated circuits, computer programs, and recording media.

Embodiments will be described in detail below, by referring to drawings as appropriate. Herein, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

Embodiment 1

Embodiment 1 will be described below, with reference to FIGS. 1 to 8.

[1-1. Schematic Structure]

FIG. 1 is a schematic diagram of an information presentation system according to Embodiment 1.

Specifically, FIG. 1 illustrates a plurality of home electrical appliances 100, mobile terminal 200, information presentation apparatus 300, communication network 400, and router 500. For example, information presentation system 1 includes the plurality of home electrical appliances 100, mobile terminal 200, and information presentation apparatus 300 from among these components. In FIG. 1, an air conditioner, a refrigerator, a light fixture, a television, and a washing machine are illustrated as the plurality of home electrical appliances 100. The plurality of home electrical appliances 100 may include home electrical appliances other than the foregoing home electrical appliances.

Information presentation system 1 is a system for estimating the behavior of a user including the current behavior of the user or the next behavior of the user and presenting information according to the estimated behavior of the user to the user who is performing or is about to perform the behavior. In this embodiment, an information presentation application in a cloud collects appliance data including the operation status of each of the plurality of home electrical appliances 100 in a house 501. On an application of mobile terminal 200, the user performs input to permit mobile terminal 200 to present information. For example, the application of mobile terminal 200 is a social network game, and the input to permit mobile terminal 200 to present information is input indicating permission to start the social network game in mobile terminal 200. At the timing when the user permits information presentation, information presentation apparatus 300 presents information according to the behavior of the user at the timing.

Each structure will be described in detail below.

[1-1-1. Mobile Terminal]

A hardware structure of mobile terminal 200 will be described below, with reference to FIG. 2.

Figure 2:
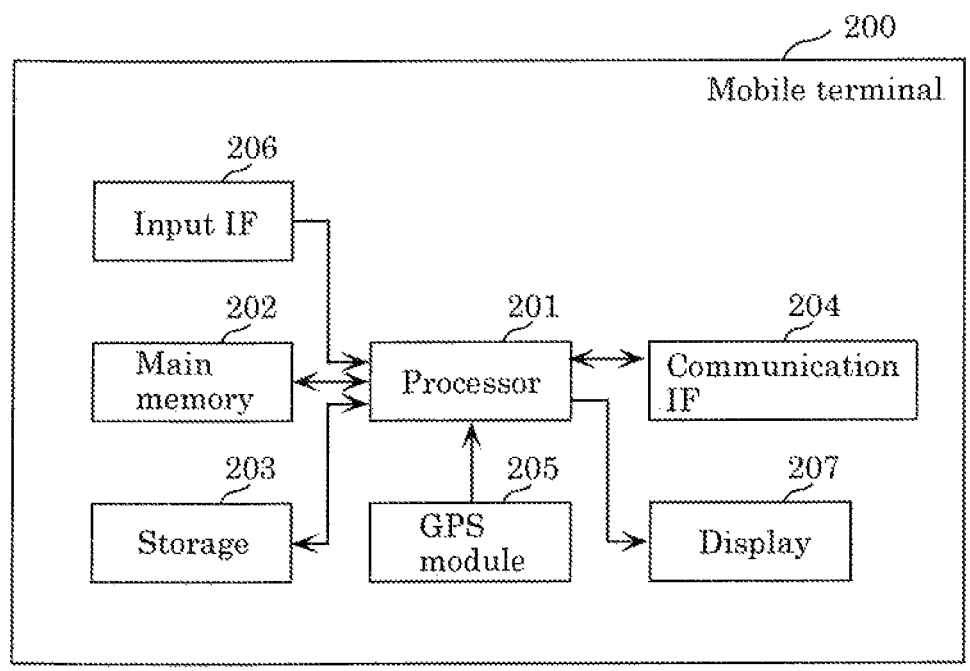
FIG. 2 is a block diagram illustrating an example of a hardware structure of a mobile terminal according to Embodiment 1.

FIG. 2 is a block diagram illustrating an example of a hardware structure of a mobile terminal according to Embodiment 1.

As illustrated in FIG. 2, mobile terminal 200 includes processor 201, main memory 202, storage 203, communication Interface (IF) 204, GPS module 205, input Interface (IF) 206, and display 207. For example, mobile terminal 200 is an information terminal capable of communication, such as a smartphone or a tablet terminal. Mobile terminal 200 is an example of a second appliance.

Processor 201 reads a control program for operating mobile terminal 200 from storage 203, and executes the read control program.

Main memory 202 is a volatile storage area (main storage device) used as a work area when processor 201 executes the control program. For example, main memory 202 is random access memory (RAM).

Storage 203 is a nonvolatile storage area (auxiliary storage device) storing the control program, content, and the like. For example, storage 203 is read only memory (ROM), flash memory, a hard disk drive (HDD), or the like.

Communication IF 204 is a communication interface that communicates with information presentation apparatus 300 via communication network 400. That is, communication IF 204 is any communication interface capable of communicable connection to communication network 400. Specifically, communication IF 204 is a communication interface that communicably connects to communication network 400 by communicable connection with a base station of a mobile communication system or by communicable connection with router 500. For example, communication IF 204 may be a wireless local area network (LAN) interface conforming to the IEEE 802.11a, b, g, n, or ac standard, or a wireless communication interface conforming to a communication standard used in a mobile communication system such as a third-generation (3G) mobile communication system, a fourth-generation (4G) mobile communication system, LTE®, or a fifth-generation (5G) mobile communication system. Through communication IF 204, mobile terminal 200 may be communicably connected to router 500 in house 501, and communicably connected to the base station of the mobile communication system outside house 501.

Communication IF 204 may be a communication interface communicably connected to communication network 400 by communicable connection with another mobile terminal. In this case, for example, communication IF 204 may be a wireless LAN interface, or a wireless communication interface conforming to the Bluetooth® standard.

GPS module 205 is a module that estimates the position of mobile terminal 200 by receiving signals from global positioning system (GPS) satellites.

Input IF 206 is, for example, a touch panel that is located on the surface of display 207 and receives input from the user to a user interface (UI) displayed on display 207. Input IF 206 may be, for example, an input device including physical switches such as a numeric keypad and a keyboard.

Display 207 is a display device that displays processing results of processor 201. For example, display 207 is a liquid crystal display, an organic EL display, or the like.

[1-1-2. Information Presentation Apparatus]

A hardware structure of information presentation apparatus 300 will be described below, with reference to FIG. 3.

Figure 3:
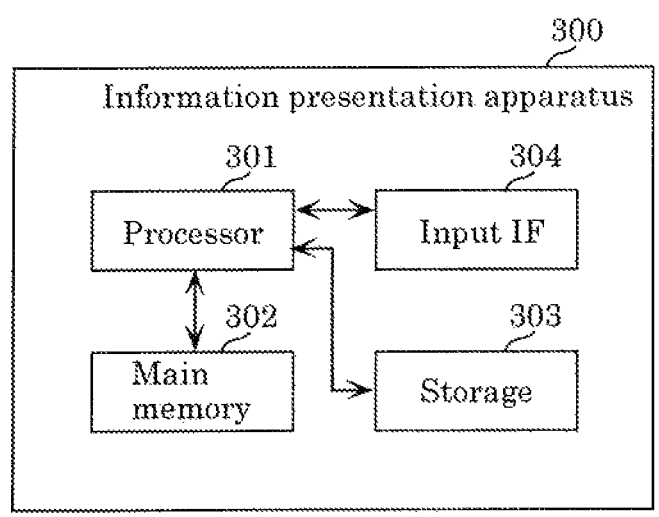
FIG. 3 is a block diagram illustrating an example of a hardware structure of a recommendation apparatus according to the embodiment.

FIG. 3 is a block diagram illustrating an example of a hardware structure of a recommendation apparatus according to the embodiment.

As illustrated in FIG. 3, information presentation apparatus 300 includes processor 301, main memory 302, storage 303, and communication IF 304. For example, information presentation apparatus 300 is a server. Information presentation apparatus 300 may be composed of a plurality of apparatuses.

Processor 301 reads a control program for operating information presentation apparatus 300 from storage 303, and executes the read control program.

Main memory 302 is a volatile storage area (main storage device) used as a work area when processor 301 executes the control program. For example, main memory 302 is RAM.

Storage 303 is a nonvolatile storage area (auxiliary storage device) storing the control program, various data, and the like. For example, storage 303 is ROM, flash memory, an HDD, or the like. The control program stored in storage 303 includes a program for performing operations relating to the below-described information presentation method.

Communication IF 304 is a communication interface that communicates with mobile terminal 200 and the plurality of home electrical appliances 100 via communication network 400. For example, communication IF 304 is a wired LAN interface. Communication IF 304 may be a wireless LAN interface. Communication IF 304 is not limited to a LAN interface, and may be any communication interface capable of establishing communicable connection with communication network 400.

[1-1-3. Home Electrical Appliance]

A hardware structure of home electrical appliance 100 will be described below, with reference to FIG. 4.

Figure 4:
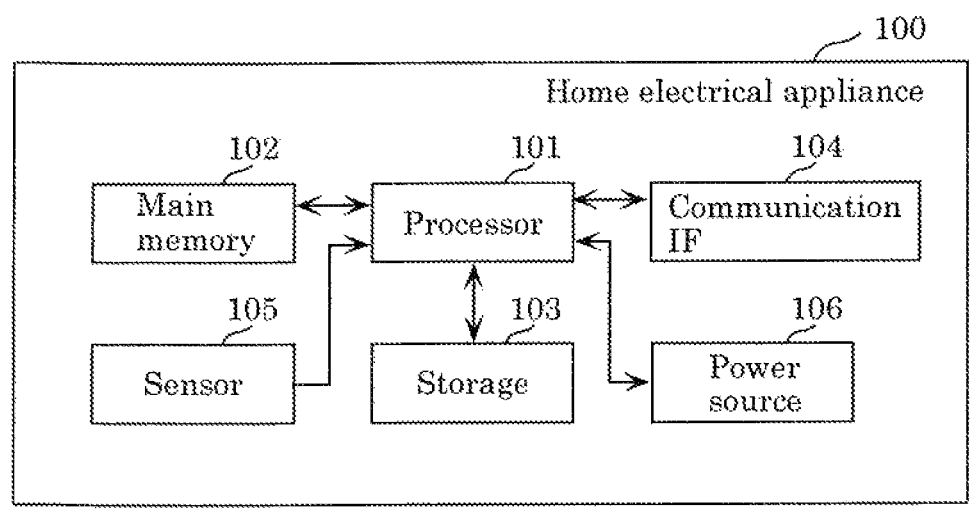
FIG. 4 is a block diagram illustrating an example of a hardware structure of a home electrical appliance according to Embodiment 1.

FIG. 4 is a block diagram illustrating an example of a hardware structure of a home electrical appliance according to Embodiment 1.

As illustrated in FIG. 4, home electrical appliance 100 includes processor 101, main memory 102, storage 103, communication IF 104, sensor 105, and power source 106. Home electrical appliance 100 is an example of a first appliance.

Processor 101 reads a control program for operating home electrical appliance 100 from storage 103, and executes the read control program.

Main memory 102 is a volatile storage area (main storage device) used as a work area when processor 101 executes the control program. For example, main memory 102 is RAM.

Storage 103 is a nonvolatile storage area (auxiliary storage device) storing the control program and the like. For example, storage 103 is ROM, flash memory, an HDD, or the like.

Communication IF 104 is a communication interface that communicably connects to router 500 to communicate with information presentation apparatus 300 via communication network 400. That is, communication IF 104 is any communication interface capable of communicable connection to router 500. For example, communication IF 104 may be a wireless local area network (LAN) interface conforming to the IEEE 802.11a, b, g, n, or ac standard, a wireless communication interface conforming to the Bluetooth® standard, or a wireless communication interface conforming to the Zigbee® standard.

Communication IF 104 is not limited to communicably connecting to router 500 via a wireless LAN. Communication IF 104 may be, for example, a wireless communication interface that communicably connects to a base station of long-range wireless communication such as a low-power wide-area (LPWA) network, to communicate with information presentation apparatus 300 via communication network 400.

Sensor 105 is a sensor that detects each state of home electrical appliance 100. The state detected by sensor 105 is provided to processor 101 and used in the execution of the control program by processor 101. For example, in the case where home electrical appliance 100 has an opening and closing portion that is opened and closed such as a door, a lid, or a tray, sensor 105 may be a sensor that detects the opening and closing state of the opening and closing portion. Sensor 105 may be a human sensor that detects whether there is any person in a space around home electrical appliance 100. Sensor 105 may be a temperature sensor that detects the temperature of the space around home electrical appliance 100 or the temperature inside home electrical appliance 100.

Power source 106 receives power used to operate home electrical appliance 100 from an external power source, and supplies the received power to each component in home electrical appliance 100.

[1-1-4. Communication Network]

A structure of the communication network will be described below, with reference to FIG. 1.

Communication network 400 is a communication network for communication among the plurality of home electrical appliances 100, mobile terminal 200, information presentation apparatus 300, and router 500. Communication network 400 may be a general-purpose network such as the Internet, or a dedicated network for communication between information presentation apparatus 300 and each of the plurality of home electrical appliances 100 and mobile terminal 200.

[1-1-5. Router]

Router 500 is capable of communication with the plurality of home electrical appliances 100 and mobile terminal 200. Router 500 is provided in house 501. Router 500 can communicate with information presentation apparatus 300 via communication network 400 such as the Internet. Router 500 relays communication between information presentation apparatus 300 and the plurality of home electrical appliances 100, by communicating with the plurality of home electrical appliances 100 and also communicating with information presentation apparatus 300 via communication network 400. For example, router 500 performs wireless communication with the plurality of home electrical appliances 100, and performs wired communication with information presentation apparatus 300.

Router 500 can also communicate with mobile terminal 200. For example, router 500 performs wireless communication with mobile terminal 200. Router 500 may, for example, perform wireless communication with the plurality of home electrical appliances 100 or mobile terminal 200 by a wireless LAN conforming to the IEEE 802.11a, b, g, n, or ac standard.

[1-2. Functional Structure of Information Presentation System]

A functional structure of information presentation system 1 will be described below, with reference to FIG. 5.

Figure 5:
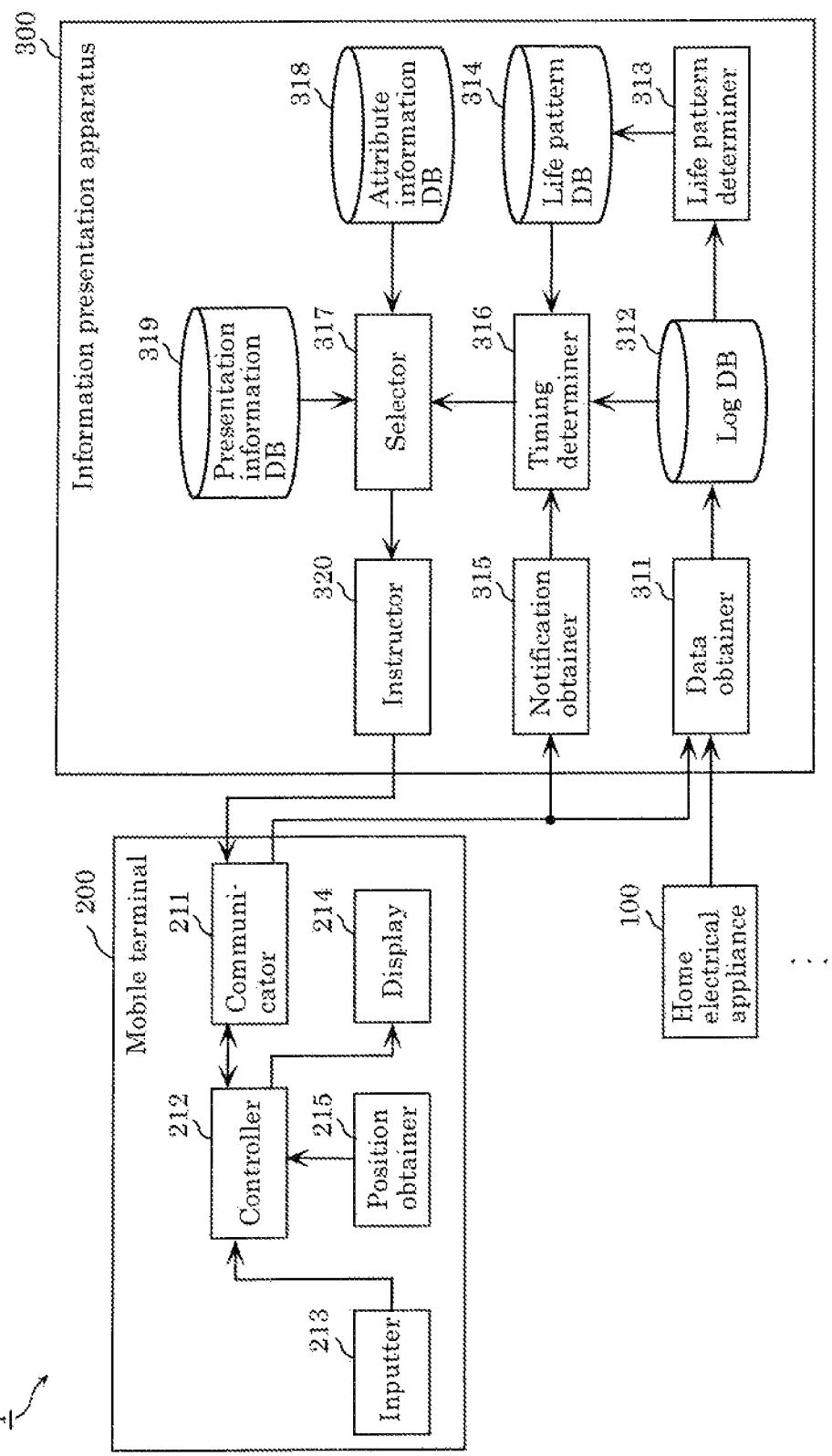
FIG. 5 is a block diagram illustrating an example of a functional structure of the information presentation system according to Embodiment 1.

FIG. 5 is a block diagram illustrating an example of a functional structure of an information presentation system according to Embodiment 1.

First, a functional structure of mobile terminal 200 will be described below.

Mobile terminal 200 includes communicator 211, controller 212, inputter 213, display 214, and position obtainer 215, as its functional structure.

Communicator 211 establishes communicable connection with information presentation apparatus 300 via communication network 400, and communicates with information presentation apparatus 300. Communicator 211 transmits various information output from controller 212, to information presentation apparatus 300. Information transmitted from communicator 211 to information presentation apparatus 300 may include a terminal ID for identifying mobile terminal 200, and may include the below-described user ID. Communicator 211 also receives information output from information presentation apparatus 300, and outputs the received information to controller 212. For example, communicator 211 is implemented by processor 201, main memory 202, storage 203, and communication IF 204.

Controller 212 executes a predetermined application. In user registration on the predetermined application, controller 212 outputs various information input using inputter 213 to communicator 211 as user information, to cause communicator 211 to transmit the user information to information presentation apparatus 300. For example, the user information includes a user ID for identifying the user, as the foregoing various information. The user information may include authentication information such as a password for authenticating the user, the address of the user, and the like, as the foregoing various information. The user information may include hobby/preference information indicating a hobby or preference of the user, as the foregoing various information.

Moreover, in appliance registration on the predetermined application, controller 212 outputs information input using inputter 213 to communicator 211 as appliance information of the user's appliance, to cause communicator 211 to transmit the output appliance information to information presentation apparatus 300. The appliance information includes an appliance ID for identifying the corresponding one of the plurality of home electrical appliances 100. Appliance registration may be performed in another terminal different from mobile terminal 200.

In the case where inputter 213 receives input to permit the presentation of information on display 214 in mobile terminal 200, on the predetermined application, controller 212 outputs, to communicator 211, permission information indicating that the presentation of information is permitted, to cause communicator 211 to transmit the output permission information to information presentation apparatus 300.

Moreover, controller 212 obtains position information from position obtainer 215, and outputs the obtained position information to communicator 211. Controller 212 may, each time the predetermined application is started, obtain position information from the position obtainer and output the obtained position information to communicator 211. Controller 212 may obtain position information from position obtainer 215 in a predetermined cycle. In this case, controller 212 may, each time position information is obtained, output the obtained position information to communicator 211. Alternatively, controller 212 may accumulate, in storage 203, position information obtained at each of a plurality of different timings, and output a plurality of items of position information accumulated in storage 203 to communicator 211. Controller 212 causes communicator 211 to transmit the output position information to information presentation apparatus 300.

Further, by executing the predetermined application, controller 212 generates a user interface (UI) for user registration or a UI for receiving input to permit the presentation of information (hereafter also referred to as "presentation information") on display 214, and outputs the generated UI to display 214.

In addition, controller 212 generates an image or graphic indicating information which communicator 211 has received from information presentation apparatus 300, and outputs the generated image or graphic to display 214.

For example, controller 212 is implemented by processor 201, main memory 202, and storage 203.

Inputter 213 receives input from the user. Specifically, inputter 213 receives input from the user to the predetermined application executed by controller 212. Inputter 213 receives, for example, input for user registration or input to permit the presentation of presentation information on display 214, to the predetermined application. For example, inputter 213 is implemented by processor 201, main memory 202, storage 203, and input IF 206.

Display 214 displays the UI generated by controller 212. Display 214 also displays the image or graphic output from controller 212. For example, display 214 is implemented by processor 201, main memory 202, storage 203, and display 207.

Position obtainer 215 obtains position information indicating the position of mobile terminal 200. Position obtainer 215 outputs the obtained position information to controller 212. For example, position obtainer 215 is implemented by GPS module 205, etc.

A functional structure of information presentation apparatus 300 will be described below.

Information presentation apparatus 300 includes data obtainer 311, log database (DB) 312, life pattern determiner 313, life pattern DB 314, notification obtainer 315, timing determiner 316, selector 317, attribute information DB 318, presentation information DB 319, and instructor 320, as its functional structure.

Data obtainer 311 sequentially obtains, from each of the plurality of home electrical appliances 100, appliance data including the operation status of home electrical appliance 100. Data obtainer 311 outputs the sequentially obtained plurality of items of appliance data to log DB 312, to accumulate the plurality of items of appliance data in log DB 312. Data obtainer 311 also sequentially obtains position information indicating the position of mobile terminal 200 from mobile terminal 200.

Each of the sequentially obtained plurality of items of appliance data includes information indicating a detection result of sensor 105 in home electrical appliance 100, whether power is supplied by power source 106 in home electrical appliance 100, the control state of processor 101 in home electrical appliance 100, and the like. For example, each item of appliance data includes at least one selected from: the opening and closing state of the opening and closing portion in home electrical appliance 100; a detection result of the human sensor for detecting whether there is any person in the space around home electrical appliance 100; and a power state indicating whether power of home electrical appliance 100 is on or off. For example, in the case where home electrical appliance 100 is one of a television, a recorder, and a tuner, each item of appliance data may be viewed program information indicating a program viewed by the user on home electrical appliance 100. Each item of appliance data may include time information indicating the timing at which the item of appliance data is generated. Each item of appliance data includes an appliance ID of the appliance that generates the item of appliance data.

Data obtainer 311 may also obtain user information for user registration from mobile terminal 200. Data obtainer 311 then stores, for example, a user ID included in the user information and the terminal ID of mobile terminal 200 in log DB 312 in association with each other. Data obtainer 311 may also obtain appliance information from mobile terminal 200. Data obtainer 311 stores an appliance ID included in the obtained appliance information in log DB 312 in association with the user ID associated with the terminal ID of mobile terminal 200 that has transmitted the appliance information. The user ID and the appliance ID are thus associated with each other. In the case where data obtainer 311 obtains appliance data from each of the plurality of home electrical appliances 100, data obtainer 311 associates the obtained appliance data with the user ID associated with the appliance ID of home electrical appliance 100 that has transmitted the appliance data.

The association between each of the plurality of home electrical appliances 100 and mobile terminal 200 is not limited to the above, and each of the plurality of home electrical appliances 100 and mobile terminal 200 may be associated with each other by being connected to the same router 500. Specifically, when mobile terminal 200 is wirelessly connected to router 500 in the case where each of the plurality of home electrical appliances 100 is wirelessly connected to router 500, each of the plurality of home electrical appliances 100 can specify mobile terminal 200 having the same global IP address as the global IP address of home electrical appliance 100. Home electrical appliance 100 and mobile terminal 200 wirelessly connected to the same router 500 are likely to be owned by the same user. Thus, the association between each of the plurality of home electrical appliances 100 and mobile terminal 200 may be performed by detecting, at home electrical appliance 100, mobile terminal 200, or router 500, that home electrical appliance 100 and mobile terminal 200 are wirelessly connected to the same router 500. The result of association in this case is transmitted from home electrical appliance 100, mobile terminal 200, or router 500 that has performed the association to information presentation apparatus 300.

For example, data obtainer 311 is implemented by processor 301, main memory 302, storage 303, and communication IF 304.

Log DB 312 stores the appliance data obtained by data obtainer 311. Log DB 312 also stores the user information, the appliance information, and the position information obtained by data obtainer 311. For example, log DB 312 is implemented by storage 303.

Life pattern determiner 313 determines, based on the appliance data stored in log DB 312, the life pattern of the user identified by the user ID associated with the appliance data. Specifically, life pattern determiner 313 obtains appliance data that has not been analyzed from log DB 312 at regular intervals, analyzes the appliance data, and stores the analysis result in life pattern DB 314. The regular intervals are, for example, daily intervals, weekly intervals, or the like. For example, life pattern determiner 313 analyzes the appliance data to estimate the behavior of the user or any of the members of a group to which the user belongs. The group to which the user belongs is, for example, a community such as a family or shared house users. The following description assumes that the user's family are the members of the group to which the user belongs, as an example.

Life pattern determiner 313 references a life pattern model using the appliance data read from log DB 312. The life pattern model is information that is used to estimate a specific life pattern and in which a type of appliance data associated with the specific life pattern beforehand and a time of generation of the appliance data are associated with each other. For each appliance data type included in the appliance data, life pattern determiner 313 estimates that the corresponding behavior of the user or the user's family in the life pattern model has been performed. Life pattern determiner 313 also estimates the time or time period when the estimated behavior has been performed, using the time at which the appliance data is generated in home electrical appliance 100.

The life pattern model may include, for each of a plurality of life patterns included in the life pattern model, a time period condition of a time period in which the life pattern is estimated to be performed. That is, in the life pattern model, each of the plurality of life patterns may be associated with the time period condition. Herein, the time period condition is a time period in one day, and may be separated between a time period in which the life pattern is estimated to be performed on a weekday and a time period in which the life pattern is estimated to be performed on a holiday. In this case, for example, for a user who works during the daytime on weekdays, the time period condition is a condition for prohibiting the estimation that the user is sleeping when the light fixture in the bedroom is off during the daytime on weekdays. Instead of such a condition of prohibition, a specific time period in which a behavior is likely to be performed may be set as the time period condition. That is, from among a plurality of behaviors that are likely to be performed in a time period condition matching the current time, one behavior matching the current appliance data may be specified as the behavior of the user.

The time period condition may include the order in which a first life pattern and a second life pattern are performed. For example, suppose the time period condition is a condition that wakeup as the first life pattern is followed by breakfast preparation as the second life pattern. In such a case, according to the time period condition, the estimation that wakeup is performed after breakfast preparation may be prohibited.

For example, life pattern determiner 313 may use appliance data indicating the power state of the vacuum cleaner, to estimate the time period from the time at which cleaning using the vacuum cleaner starts to the time at which the cleaning finishes as the cleaning time of the user. That is, in the case of estimating the cleaning time of the user, for example, life pattern determiner 313 may estimate, using the appliance data of the vacuum cleaner obtained for a predetermined period of time before the current time, a time period from an average time at which the vacuum cleaner is turned on to an average time at which the vacuum cleaner is turned off in the predetermined period of time, as the cleaning time of the user. The predetermined period of time is, for example, one week, two weeks, or one month. Life pattern determiner 313 may, for example, perform estimation for any other behavior based on a time variation of the same type of appliance data, in the same way as the estimation of the cleaning time.

Life pattern determiner 313 stores the estimated life pattern in life pattern DB 314. For example, life pattern determiner 313 is implemented by processor 301, main memory 302, and storage 303.

Notification obtainer 315 obtains notification of an opportunity of presenting presentation information by mobile terminal 200, from mobile terminal 200. Having obtained the notification, notification obtainer 315 informs timing determiner 316 that the notification has been obtained from mobile terminal 200. For example, notification obtainer 315 is implemented by processor 301, main memory 302, storage 303, and communication IF 304.

Timing determiner 316 determines whether to present presentation information by (i.e. on) mobile terminal 200 based on the appliance data obtained by data obtainer 311, after notification obtainer 315 obtains the notification. Specifically, timing determiner 316 determines whether the obtained appliance data is associated with timing information in timing correspondence information, using the obtained appliance data. In the case where the obtained appliance data is associated with the timing information in the timing correspondence information, timing determiner 316 determines to present the presentation information by mobile terminal 200. In the case where the obtained appliance data is not associated with the timing information in the timing correspondence information, timing determiner 316 determines not to present the presentation information by mobile terminal 200.

Timing determiner 316 may determine whether to present the presentation information by mobile terminal 200, based on not only the appliance data but also the position information obtained in mobile terminal 200. In the case where position information indicating a position around the user's workplace is obtained by data obtainer 311, timing determiner 316 may determine that the user is working, and determine not to present the presentation information by mobile terminal 200. In the case where position information indicating a position on the route from the user's workplace to his or her home is obtained by data obtainer 311, timing determiner 316 may determine that the user has finished working, and determine to present the presentation information by mobile terminal 200. For example, timing determiner 316 is implemented by processor 301, main memory 302, and storage 303.

The timing correspondence information is, for example, information illustrated in FIG. 6.

FIG. 6 is a diagram illustrating an example of timing correspondence information for determining a life pattern using appliance data. Although the items "timing information", "appliance data type", and "use example" are indicated in the correspondence information illustrated in FIG. 6 as an example, the timing correspondence information is not limited to such as long as the timing information and the appliance data type are associated with each other, and the use example may be omitted from the association. The use example is an example of presentation information presented at the timing indicated by the timing information associated with the appliance data.

For example, timing determiner 316 estimates the time period during which the washing machine is in washing operation, as the washing time of the user. Timing determiner 316 may estimate the time period during which the air conditioner or the light fixture installed in the child's room is on, as the study time of the user's child. Timing determiner 316 may estimate the time period during which the light fixture installed in the child's room is off, as the bedtime of the user's child. Timing determiner 316 may estimate the time at which the vacuum cleaner is turned off, as the housework finish time. Timing determiner 316 may estimate the time period after the time at which the door of the refrigerator is opened and closed, as the night drink time. Timing determiner 316 may estimate the time period at night after the time at which the door of the freezer is opened and closed, as the night ice-cream time. Timing determiner 316 may estimate the time period during which the light fixture in the child's room is off and the television is on, as the television time with the child. Timing determiner 316 may estimate the time period during which the human sensor in the air conditioner installed in the living room detects persons, the light fixture installed in the living room is on, and the light fixtures installed in the other rooms are off, as the family gathering time. Timing determiner 316 may estimate the time period after the time at which the rice cooking operation of the rice cooker ends on a daily basis, as the mealtime. Timing determiner 316 may estimate the time at which the light fixture or the television is turned on on a daily basis, as the return home time of the child. Timing determiner 316 may estimate the time at which the light fixture in the bedroom is turned off, as the holiday wakeup time of the user.

Selector 317 selects one of a plurality of candidates for the presentation information as the information to be presented by mobile terminal 200, according to the obtained appliance data. Specifically, selector 317 may select one of the plurality of candidates stored in presentation information DB 319 as the information to be presented by mobile terminal 200, according to the plurality of items of appliance data accumulated in log DB 312. Selector 317 may estimate the next behavior of the user of mobile terminal 200 according to the plurality of items of appliance data accumulated in log DB 312, and select, according to the estimated behavior, one of the plurality of candidates as the presentation information to be presented by mobile terminal 200. Selector 317 may reference life pattern DB 314, and estimate, as the next behavior of the user, the behavior performed in the life pattern of the user following the behavior of the user estimated according to the current appliance data. Selector 317 may select one of the plurality of candidates further according to attribute information of the user stored in attribute information DB 318.

Attribute information DB 318 is a storage device storing the attribute information indicating at least one attribute of the user. For example, attribute information DB 318 is implemented by storage 303.

The attribute of the user may be, for example, a hobby or preference of the user, and/or demographic information. Examples of the hobby or preference of the user include games, game machines, game strategies, baseball, American football, ski, cameras, audio equipment, recorders, liquid crystal televisions, high-definition televisions, video, social networking service (SNS), music, coffee, cooking recipes, cars, car exterior, travels, travel bags, route maps, child care, interior decoration, and gardening. Examples of the demographic information include the user's age, sex, resident area, annual income, marital status, parental status, occupation classification, place of work, and education.

The attribute information of the user stored in attribute information DB 318 may be generated based on the user's address, hobby/preference information, and the like included in the user information transmitted from mobile terminal 200. The attribute information of the user may be generated based on the user's web browsing history, in mobile terminal 200 or another information terminal. Thus, the hobby or preference of the user of mobile terminal 200 is obtained beforehand.

Presentation information DB 319 is a storage device storing a plurality of candidates for presentation information to be presented by mobile terminal 200 of the user. For example, presentation information DB 319 is implemented by storage 303. The plurality of candidates are, for example, information illustrated in FIG. 7.

FIG. 7 is a diagram illustrating an example of presentation information associated with timing information.

As illustrated in FIG. 7, the plurality of candidates for the presentation information are each associated with a timing of presenting the candidate on mobile terminal 200. The timing of presentation on mobile terminal 200 is specified by timing determiner 316 based on timing information in the timing correspondence information associated with appliance data. The plurality of candidates for the presentation information may each be further associated with attribute information of a user. Hence, selector 317 can select the presentation information by referencing the information stored in presentation information DB 319 using the presentation timing specified by timing determiner 316. Selector 317 can also select the presentation information by obtaining the attribute information of the user from attribute information DB 318 and referencing the information stored in presentation information DB 319 using the obtained attribute information of the user. The presentation information is, for example, an ad of a product or a service corresponding to the presentation timing and the attribute information of the user, as illustrated in FIG. 7.

For example, in the case where the attribute information of the user indicates a female who works full-time and lives in an urban area, if the timing indicated by the timing information obtained from timing determiner 361 is within 30 minutes after washing end, selector 317 may select information of a new detergent product that curves smell even in indoor drying as the presentation information. For example, in the case where the attribute information of the user indicates a person in 40s who has at least one child and is education-oriented, if the timing indicated by the timing information obtained from timing determiner 361 is the child's study time, selector 317 may select information of a correspondence course for new junior high students as the presentation information. For example, in the case where the hobby/preference in the attribute information of the user is recorders and the user is a male with high income, if the timing indicated by the timing information obtained from timing determiner 361 is the child's bedtime, selector 317 may select information of a new 4K-compatible recorder product as the presentation information. For example, in the case where the attribute information of the user indicates a person who works part-time and resides near a supermarket, if the timing indicated by the timing information obtained from timing determiner 361 is within 1 hour after cleaning end, selector 317 may select the supermarket's special sale information as the presentation information. For example, in the case where the attribute information of the user indicates a female who works full-time, if the timing indicated by the timing information obtained from timing determiner 361 is within 2 hours before dinner cooking time, selector 317 may select information of easy-to-cook mapo tofu sauce as the presentation information.

Instructor 320 instructs mobile terminal 200 to present the presentation information, after timing determiner 316 determines to present the presentation information by mobile terminal 200. Instructor 320 prohibits mobile terminal 200 from presenting the presentation information, after timing determiner 316 determines not to present the presentation information by mobile terminal 200. The presentation information indicated by instructor 320 is the candidate selected by selector 317. To instruct mobile terminal 200 to present the presentation information, instructor 320 transmits, to mobile terminal 200, information including the presentation information and an instruction to mobile terminal 200 to present the presentation information.

In the case where timing determiner 316 determines to present the presentation information by mobile terminal 200, instructor 320 may instruct mobile terminal 200 to display the presentation information in a specific region of the display region of display 214 in mobile terminal 200. In the case where timing determiner 316 determines not to present the presentation information by mobile terminal 200, instructor 320 may instruct mobile terminal 200 to display blank in the specific region of the display region of display 214 in mobile terminal 200, or instruct mobile terminal 200 to display information other than the presentation information in the specific region, to prohibit mobile terminal 200 from presenting the presentation information.

For example, instructor 320 is implemented by processor 301, main memory 302, storage 303, and communication IF 304.

Each of the plurality of home electrical appliances 100 transmits appliance data to information presentation apparatus 300 via communication network 400, per the predetermined period of time. Each of the plurality of home electrical appliances 100 may, for example, transmit appliance data every 5 minutes. Each of the plurality of home electrical appliances 100 may transmit appliance data to information presentation apparatus 300 via communication network 400 per the predetermined period of time, only in the case where its power is on. In this case, if appliance data is not obtained even when the predetermined period of time has passed from the last time appliance data was obtained, information presentation apparatus 300 may determine that the power of the appliance corresponding to the appliance data is off.

[1-3. Operation]

An information presentation method performed in information presentation system 1 having the above-described structure will be described below.

FIG. 8 is a sequence diagram illustrating an example of the information presentation method by the information presentation system.

First, as a result of user registration and appliance registration being performed, mobile terminal 200 transmits user information and appliance information to information presentation apparatus 300 via communication network 400 (S11).

Information presentation apparatus 300 receives the user information and the appliance information, and registers the received user information and appliance information (S12).

Next, each of the plurality of home electrical appliances 100 transmits appliance data to information presentation apparatus 300 via communication network 400 (S13). Each of the plurality of home electrical appliances 100 transmits appliance data generated at the time to information presentation apparatus 300, per the predetermined period of time.

In information presentation apparatus 300, data obtainer 311 obtains appliance data from each of the plurality of home electrical appliances 100, and accumulates the obtained appliance data in log DB 312 (S14).

Life pattern determiner 313 determines the life pattern of the user using the appliance data accumulated in log DB 312 (S15), and accumulates the determined life pattern in life pattern DB 314 (S16).

Next, mobile terminal 200 transmits notification of an opportunity of presenting presentation information by mobile terminal 200 (S17). Notification obtainer 315 in information presentation apparatus 300 obtains the notification of the opportunity from mobile terminal 200.

Timing determiner 316 in information presentation apparatus 300 determines whether to present information by mobile terminal 200, based on the appliance data obtained by data obtainer 311 (S18).

Selector 317 in information presentation apparatus 300 selects one of a plurality of candidates as presentation information to be presented by mobile terminal 200, according to the appliance data obtained by data obtainer 311 (S19).

Instructor 320 in information presentation apparatus 300 transmits instruction information indicating instructing mobile terminal 200 to present the presentation information, after timing determiner 316 determines to present the presentation information by mobile terminal 200 (S20). Instructor 320 transmits instruction information indicating prohibiting mobile terminal 200 from presenting the presentation information, after timing determiner 316 determines not to present the presentation information by mobile terminal 200.

Having received the instruction information, mobile terminal 200 displays the presentation information on display 214 in the case where the instruction information indicates instructing mobile terminal 200 to present the presentation information, and displays blank or other information on display 214 in the case where the instruction information indicates prohibiting mobile terminal 200 from presenting the presentation information (S21).

Detailed description of each of these steps is omitted here, as the details of the operations of the processing units have already been described in the description of the functional structure of information presentation system 1.

[1-4. Advantageous Effects, Etc.]

As described above, with the information presentation method according to this embodiment, whether to present the presentation information by mobile terminal 200 is determined according to the appliance data obtained from home electrical appliance 100, so that the presentation information can be presented by the mobile terminal at a timing according to the appliance data. Moreover, the subsequent determination by timing determiner 316 and instruction by instructor 320 are not performed unless the notification is obtained from mobile terminal 200, with it being possible to prevent frequent presentation of the presentation information by mobile terminal 200. Hence, the user can be kept from being bothered with unnecessary information presentation, and the presentation information can be presented to the user at an optimal timing for the user. In addition, the processing load and the power consumption of mobile terminal 200 can be reduced.

With the information presentation method according to this embodiment, one candidate is selected from a plurality of candidates as the presentation information to be presented by mobile terminal 200 according to the obtained appliance data, and instruction information indicating an instruction to present the selected one candidate as the presentation information is transmitted. Thus, optimal presentation information according to the appliance data can be presented to the user.

With the information presentation method according to this embodiment, the one candidate is selected from the plurality of candidates as the presentation information to be presented by mobile terminal 200, according to a plurality of items of appliance data sequentially obtained and accumulated in log DB 312. Thus, optimal presentation information according to the accumulated plurality of items of appliance data can be presented to the user.

With the information presentation method according to this embodiment, each of the plurality of items of appliance data sequentially obtained includes time information indicating a time at which the item of appliance data is generated in home electrical appliance 100. Thus, optimal presentation information according to the plurality of items of appliance data that are the accumulated plurality of items of appliance data and each include time information can be presented to the user.

With the information presentation method according to this embodiment, a next behavior of a user of mobile terminal 200 is estimated according to the plurality of items of appliance data accumulated in log DB 312, and, according to the estimated behavior, the one candidate is selected from the plurality of candidates as the presentation information to be presented by mobile terminal 200. Thus, optimal presentation information according to the behavior which the user is estimated to perform next can be presented to the user.

With the information presentation method according to this embodiment, the one candidate is selected from the plurality of candidates according to a hobby or preference of the user. Thus, optimal presentation information according to the hobby or preference of the user can be presented to the user.

With the information presentation method according to this embodiment, the appliance data includes at least one selected from: a power state indicating whether power of home electrical appliance 100 is on or off; an opening and closing state of an opening and closing portion in home electrical appliance 100; and a detection result of a human sensor in home electrical appliance 100. Thus, whether to present the presentation information by mobile terminal 200 is determined according to the appliance data that includes at least one of the power state, the opening and closing state, and the human detection result obtained from home electrical appliance 100, so that the presentation information can be presented by mobile terminal 200 at a timing according to at least one of the power state, the opening and closing state, and the human detection result.

With the information presentation method according to this embodiment, home electrical appliance 100 is one of a television, a recorder, and a tuner, and the appliance data is viewed program information indicating a program viewed on home electrical appliance 100. Thus, whether to present the presentation information by mobile terminal 200 is determined according to the appliance data including the viewed program information obtained from home electrical appliance 100, so that the information can be presented by mobile terminal 200 at a timing according to the viewed program information.

With the information presentation method according to this embodiment, after the notification is obtained, whether to present the presentation information by mobile terminal 200 is determined based on the plurality of items of appliance data obtained from the plurality of home electrical appliances 100. Thus, whether to present the presentation information by mobile terminal 200 is determined according to the plurality of items of appliance data obtained from the plurality of home electrical appliances 100, so that the behavior of the user can be determined accurately. Accordingly, the presentation information can be presented by mobile terminal 200 at a more accurate timing.

Embodiment 2

An information presentation system according to Embodiment 2 will be described below, with reference to FIG. 9.

Figure 9:
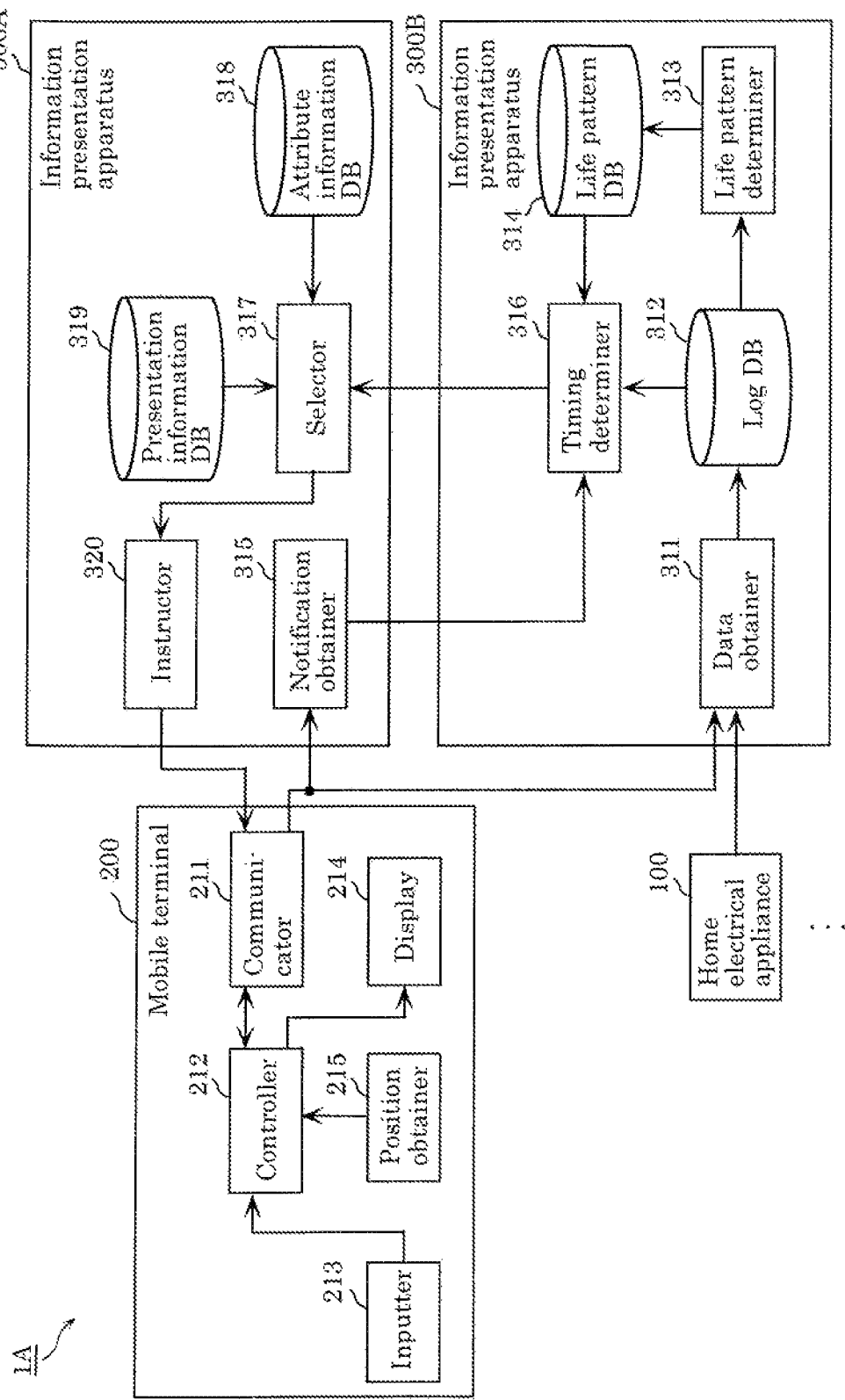
FIG. 9 is a schematic diagram of an information presentation system according to Embodiment 2.

FIG. 9 is a schematic diagram of the information presentation system according to Embodiment 2.

Information presentation system 1A according to Embodiment 2 differs from information presentation system 1 according to Embodiment 1 in that the function of information presentation apparatus 300 in information presentation system 1 is separated between two information presentation apparatuses 300A and 300B. In FIG. 9, the same components as those in Embodiment 1 are given the same reference signs as in Embodiment 1.

Information presentation apparatus 300A includes notification obtainer 315, selector 317, attribute information DB 318, presentation information DB 319, and instructor 320. Information presentation apparatus 300B includes data obtainer 311, log DB 312, life pattern determiner 313, life pattern DB 314, and timing determiner 316. Notification obtainer 315 in information presentation apparatus 300A, having received notification from mobile terminal 200, informs timing determiner 316 in presentation apparatus 300B that the notification has been obtained. Timing determiner 316 in information presentation apparatus 300B transmits a determination result to selector 317 in information presentation apparatus 300A. Thus, the functions of information presentation apparatus 300 according to Embodiment 1 may be separated between two information presentation apparatuses 300A and 300B in information presentation system 1A.

The foregoing embodiments have been described to illustrate the disclosed technology, through the detailed description and the accompanying drawings.

The structural elements in the detailed description and the accompanying drawings may include not only the structural elements essential for the solution of the problem but also the structural elements not essential for the solution of the problem, to illustrate the disclosed technology. The inclusion of such optional structural elements in the detailed description and the accompanying drawings therefore does not mean that these optional structural elements are essential structural elements.

The foregoing embodiments are intended to be illustrative of the disclosed technology, and therefore various changes, replacements, additions, omissions, etc. can be made within the scope of the appended claims and their equivalents.

INDUSTRIAL APPLICABILITY

The disclosed technology can be applied to an information presentation method, an information presentation system, an information presentation apparatus, etc. capable of presenting appropriate information to a user at an optimal timing.

REFERENCE SIGNS LIST 1, 1A information presentation system
100 home electrical appliance
101 processor
102 main memory
103 storage
104 communication IF
105 sensor
106 power source
200 mobile terminal
201 processor
202 main memory
203 storage
204 communication IF
205 GPS module
206 input IF
207 display
211 communicator
212 controller
213 inputter
214 display
215 position obtainer
300, 300A, 300B information presentation apparatus
301 processor
302 main memory
303 storage
304 communication IF
311 data obtainer
312 log DB
313 life pattern determiner
314 life pattern DB
315 notification obtainer
316 timing determiner
317 selector
318 attribute information DB
319 presentation information DB
320 instructor
400 communication network
500 router
501 house

The invention claimed is:

1. An information presentation method executed by one or more computers, the one or more computers each including:

a processor, a memory in which a program is stored, and a communication interface that communicates with a home electrical appliance and an information terminal different from the home electrical appliance via a communication network, the information presentation method comprising:

sequentially receiving by the communication interface via the communication network, from the home electrical appliance, appliance data including an operation status of the home electrical appliance;

receiving by the communication interface via the communication network, from the information terminal, notification of an opportunity of presenting information by the information terminal;

determining by the processor, after receiving the notification in the receiving, whether the memory includes a first behavior of a user of the home electrical appliance preliminarily associated with the appliance data received in the sequentially receiving, to determine by the processor whether a timing for presenting the information is appropriate for the first behavior performed by the user;

estimating by the processor, a second behavior to be performed next by the user, based on the appliance data received in the sequentially receiving and a life pattern model of the user which is estimated in advance based on the appliance data, and selecting by the processor, one candidate from a plurality of candidates stored in the memory as the information to be presented by the information terminal, according to the second behavior to be performed next to the first behavior by the user, the life pattern model including a plurality of life behaviors which are estimated to be performed by the user in a unit of predetermined period and are temporally continuous, the plurality of life behaviors including the first behavior and the second behavior;

obtaining position information indicating a position of the information terminal using a GPS system;

determining whether a location of the information terminal for presenting the information is appropriate; and (i) instructing by the processor, the information terminal to present the one candidate selected according to the second behavior in the selecting, when the timing for presenting the information is determined to be appropriate as a result of determining that the memory includes the first behavior associated with the appliance data in the determining and the location for presenting the information is determined to be appropriate as a result of determining that the location of the information terminal for presenting the information is appropriate, and (ii) prohibiting by the processor, the information terminal from presenting the information, when the timing for presenting the information is determined not to be appropriate as a result of determining that the memory does not include the first behavior associated with the appliance data in the determining or when the location for presenting the information is not determined to be appropriate as a result of determining that the location of the information terminal for presenting the information is not appropriate.

2. The information presentation method according to claim 1, further comprising:

accumulating by the processor, in a storage device, a plurality of items of appliance data sequentially obtained in the sequentially obtaining, the plurality of items of appliance data each being the appliance data, wherein the selecting includes selecting the one candidate from the plurality of candidates according to the plurality of items of appliance data accumulated in the storage device.

3. The information presentation method according to claim 2, wherein each of the plurality of items of appliance data sequentially obtained in the sequentially obtaining includes time information indicating a time at which an item of the appliance data is generated in the home electrical appliance.

4. The information presentation method according to claim 3, wherein the selecting includes estimating a next behavior of a user of the information terminal according to the plurality of items of appliance data accumulated in the storage device, and selecting, as the information to be presented by the information terminal, the one candidate from the plurality of candidates according to the next behavior estimated.

5. The information presentation method according to claim 1, further comprising:

obtaining by the processor, a preference of a user of the information terminal,
wherein the selecting includes selecting the one candidate from the plurality of candidates according to the preference of the user obtained in the obtaining.

6. The information presentation method according to claim 1, further comprising:
obtaining by the processor, position information indicating a position of the information terminal acquired from a GPS system, from the information terminal,
wherein the determining includes determining whether the memory includes the first behavior of the user of the home electrical appliance based on the appliance data and the position information.

7. The information presentation method according to claim 1, wherein the appliance data includes at least one selected from: a power state indicating whether power of the home electrical appliance is on or off; an opening and closing state of an opening and closing portion in the home electrical appliance; and a detection result of a human sensor in the home electrical appliance.

8. The information presentation method according to claim 1, wherein the home electrical appliance is one of a television, a recorder, and a tuner, and the appliance data is viewed program information indicating a program viewed on the home electrical appliance.

9. The information presentation method according to claim 1,
wherein the sequentially obtaining includes sequentially obtaining, from each of a plurality of home electrical appliances, appliance data including an operation status of a corresponding one of the plurality of home electrical appliances, the plurality of home electrical appliances each being the home electrical appliance, and
the determining includes determining, after receiving the notification in the receiving, whether the memory includes the first a behavior of the user of the home electrical appliance based on a plurality of items of appliance data obtained from the plurality of home electrical appliances in the sequentially obtaining, the plurality of items of appliance data each being the appliance data.

10. An information presentation system, comprising:
a home electrical appliance;
an information terminal different from the home electrical appliance; and
an information presentation apparatus, wherein:
the home electrical appliance, the information terminal and the information presentation apparatus are coupled with each other by a communication network,
the home electrical appliance includes a first processor, a first memory storing a first program, and the first program, when executed by the first processor, causes the home electrical appliance to transmit appliance data including an operation status of the home electrical appliance, to the information presentation apparatus,
the information terminal includes a second processor, a second memory storing a second program, and the second program, when executed by the second processor, causes the information terminal to transmit notification of an opportunity of presenting information, to the information presentation apparatus, and
the information presentation apparatus includes a third processor, a third memory storing a third program, and the third program, when executed by the third processor, causes the information presentation apparatus to:
sequentially obtain, via the communication network, the appliance data from the home electrical appliance;
receive, via the communication network, the notification from the information terminal;
determine, after receiving the notification, whether the third memory includes a first behavior of a user of the home electrical appliance preliminarily associated with the appliance data sequentially obtained, to determine whether a timing for presenting the information is appropriate for the first behavior performed by the user;
estimate a second behavior to be performed next by the user, based on the appliance data obtained in the sequentially obtaining and a life pattern model of the user which is estimated in advance based on the appliance data, and select one candidate from a plurality of candidates stored in the third memory as the information to be presented by the information terminal, according to the second behavior to be performed next to the first behavior by the user, the life pattern model including a plurality of life behaviors which are estimated to be performed by the user in a unit of predetermined period and are temporally continuous, the plurality of life behaviors including the first behavior and the second behavior;
obtain position information indicating a position of the information terminal using a GPS system;
determine whether a location of the information terminal for presenting the information is appropriate; and
(i) instruct the information terminal to present the candidate selected according to the second behavior, when the timing for presenting the information is determined to be appropriate, as a result of determining that the third memory includes the first behavior associated with the appliance data and the location for presenting the information is determined to be appropriate as a result of determining that the location of the information terminal for presenting the information is appropriate, and (ii) prohibit the information terminal from presenting the information, when the timing for presenting the information is determined not to be appropriate, as a result of determining that the third memory does not include the first behavior associated with the appliance data or when the location for presenting the information is not determined to be appropriate as a result of determining that the location of the information terminal for presenting the information is not appropriate.

11. An information presentation apparatus, comprising:
a processor; and
a memory storing a program,
wherein the program, when executed by the processor, causes the information presentation apparatus to:
sequentially obtain, via communication network, the appliance data from a home electrical appliance;
receive, via the communication network, a notification from an information terminal different from the home electrical appliance;
determine, after receiving the notification, whether the memory includes a first behavior of a user of the home electrical appliance preliminarily associated with the appliance data sequentially obtained, to determine whether a timing for presenting the information is appropriate for the first behavior performed by the user;
estimate a second behavior to be performed next by the user, based on the appliance data obtained in the sequentially obtaining and a life pattern model of the user which is estimated in advance based on the appliance data, and select one candidate from a plurality of candidates stored in the memory as the information to be presented by the information terminal, according to the second behavior to be performed next to the first behavior by the user, the life pattern model including a plurality of life behaviors which are estimated to be performed by the user in a unit of predetermined period and are temporally continuous, the plurality of life behaviors including the first behavior and the second behavior;

obtain position information indicating a position of the information terminal using a GPS system;

determine whether a location of the information terminal for presenting the information is appropriate; and (i) instruct the information terminal to present the candidate selected according to the second behavior to, when the timing for presenting the information is determined to be appropriate, as a result of determining that the memory includes the first behavior associated with the appliance data and the location for presenting the information is determined to be appropriate as a result of determining that the location of the information terminal for presenting the information is appropriate, and (ii) prohibit the information terminal from presenting the information, when the timing for presenting the information is determined not to be appropriate, as a result of determining that the memory does not include the first behavior associated with the appliance data or when the location for presenting the information is not determined to be appropriate as a result of determining that the location of the information terminal for presenting the information is not appropriate.

* * * * *